Dec. 20, 1955  J. THOMSON  2,727,617
BELT CONVEYOR
Filed Nov. 21, 1952  2 Sheets-Sheet 1
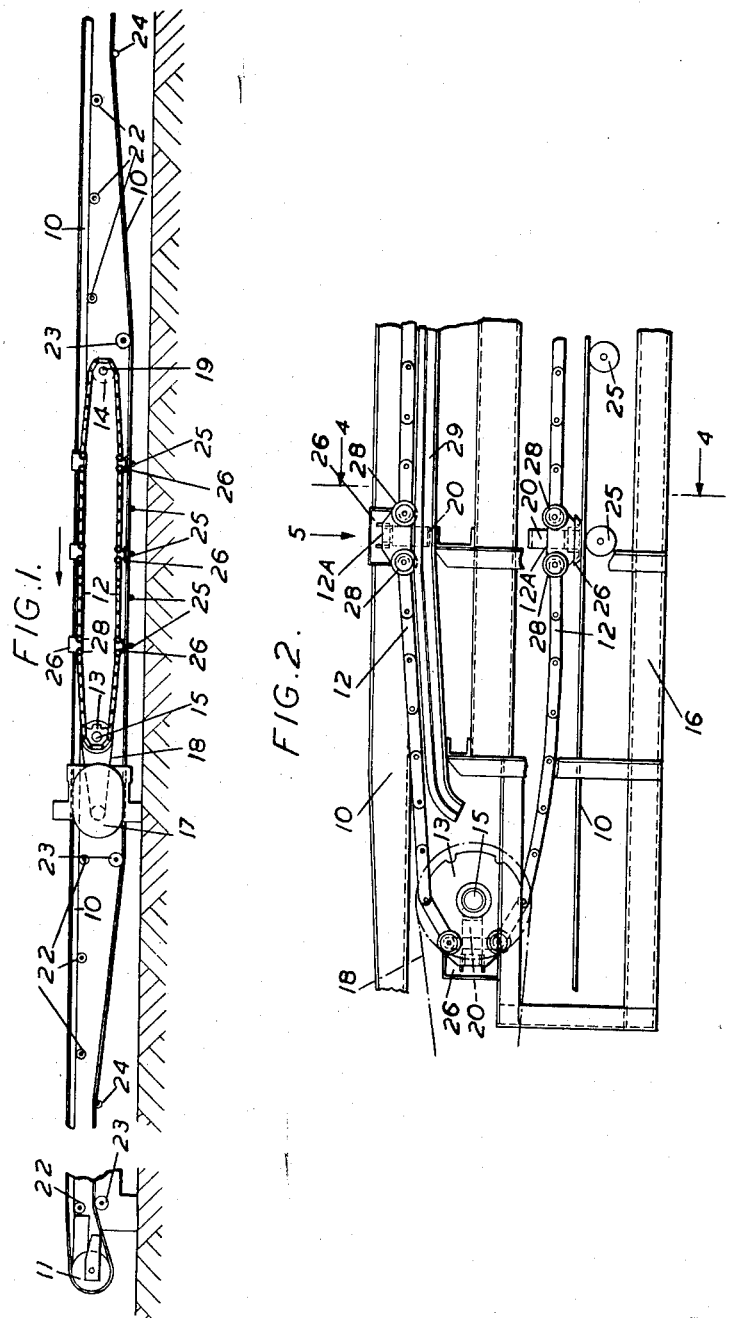
James Thomson
Inventor
By
Richardson, Davis and Nydon
his Attorneys Dec. 20, 1955  J. THOMSON  2,727,617
BELT CONVEYOR
Filed Nov. 21, 1952  2 Sheets-Sheet 2
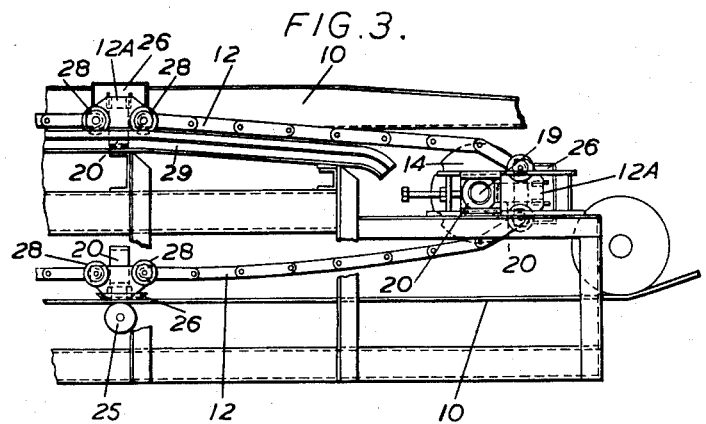
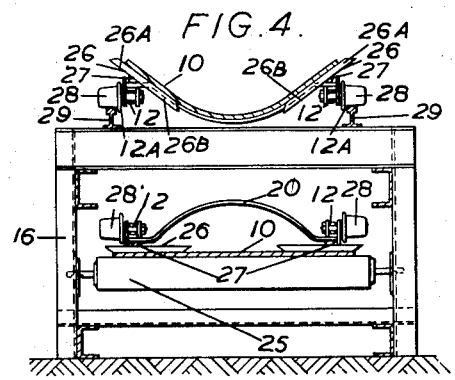
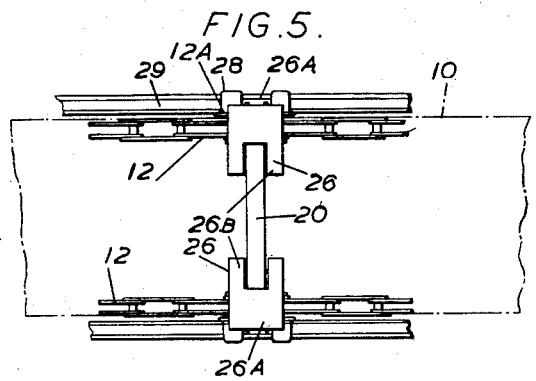
James Thomson
Inventor
By
his Attorneys.

United States Patent Office 2,727,617
Patented Dec. 20, 1955

2,727,617

BELT CONVEYOR

James Thomson, Glasgow, Great Britain, assignor to Mavor & Coulson Limited, Glasgow, Great Britain Application November 21, 1952, Serial No. 321,812

5 Claims. (Cl. 198—191)

This invention relates to belt conveyors of the type in which an endless belt, which carries the load of material being conveyed, is led round supporting pulleys and is entrained by a pair of endless power-driven cables (such as chains or steel ropes) which extend alongside the belt and are led round pulleys that drive and support the cables. That is to say, the work of the endless belt is confined to carriage of the material being conveyed, whereas the work of transmitting the drive to the belt is undertaken by the cables.

The present invention comprises a belt conveyor of the type stated having a driving assembly in which a pair of juxtaposed endless power-driven cables are bridged at intervals by cross carriers that are each secured to both cables, and in which a series of said carriers receive the working run of the endless belt so that the carriers (without being in any way secured to the belt) bear some of the weight of the working run and transmit the drive thereto.

Provision may be made for holding the return run of the endless belt against the cross carriers in the return run of the power-driven cables in order to spread the work of transmitting the drive over both runs of the belt, thus reducing the major tensions in the cables and in the endless belt.

Preferably, the cross carriers are formed each like a bow, being curved or angular, so that the series of carriers upon which the working run rests is like a cradle, serving to maintain the working run of the belt in a trough or channel form or to force said run to adopt such a form, which is suitable to the accommodation of the material to be conveyed.

Preferably, also, pivotal belt-engaging pads are incorporated in the cross carriers so as to be movable from V-relationship to flat relationship to conform with the upper and lower runs of the belt, respectively.

A conveyor according to the invention may have a series of two or more cradle units; that is to say, similar structural units, longitudinally spaced apart and each comprising a pair of juxtaposed cables bridged by cross carriers, each such pair of cables having its own driving motor.

Advantages of the belt conveyor driving assembly according to the invention are that it permits ordinary endless belts to be used without need for attachments thereon for engagement with the power-driven cables and that the effective length of the conveyor can be rapidly extended by extending only the belt in any conventional way, leaving the power-driven cables unaffected, except that it may be expedient to add one or more cradle units. Another advantage is that one can use an endless belt conveyor more or less consisting of standard or conventional parts.

Seeing that a pair of endless power-driven cables bridged at intervals by cross carriers for the purpose hereinbefore described may be assembled for combination with a belt conveyor, for instance may be assembled as a self-contained independently motor-driven unit, the present invention also comprises such an assembly per se.

An example of a belt conveyor embodying the invention is shown in the accompanying drawings, in which:

Fig. 1 is a diagrammatic side elevation of a substantial length of the conveyor.

Figs. 2 and 3 are side elevations, to a larger scale than Fig. 1, respectively of the left-hand and right-hand end portions of a power-driven cradle unit incorporated in the conveyor.

Fig. 4 is a section on the line 4—4 of Fig. 2.

Fig. 5 is a part plan as viewed at the arrow 5 of Fig. 2.

In the example shown, the belt conveyor includes a wide endless belt 10, composed say of rubber or the equivalent, which is led round terminal pulleys 11 serving purely to support and guide the belt at the ends of the conveyor framework, only one of these pulleys, namely at the left-hand end being shown (Fig. 1). One or each of these pulleys 11 is adjustable lengthwise of the conveyor for regulation of the belt tension, as is the usual practice.

The conveyor-driving cradle unit shown comprises two endless cables consisting of chains 12, which are arranged along opposite sides of the belt, each chain being led round two sprockets 13 and 14. The pair of sprockets 13 are mounted on a shaft 15 which is journalled on the framework 16 of the unit, and is driven by an electric motor 17 and driving gear 18; and the pair of sprockets 14 are mounted on a shaft 19 journalled in horizontally adjustable bearings 20 also mounted on the framework 16. The bearings 20 are adjustable in order that the tension of the chains can be regulated. The chains move in parallel vertical planes, and in the same sense as the endless belt is driven.

The cross carriers of the cradle unit, which supports the working run of the belt 10, comprise metal slatlike members 21, each bridging the chains and being secured at opposite ends to the chains, so that the chain-and-carrier assembly has the appearance of an endless flexible travelling ladder. The cross members 21 are curved into bow formation, the curvature being downwards in the working run and upwards in the return run, as Fig. 4 shows. Those portions of the working run of the endless belt 10 which are beyond the range of operation of the cradle unit are supported in the usual manner by belt-troughing idler roller assemblies of any appropriate construction, as shown conventionally at 22 in Fig. 1; and the return run of the belt 10 is trained over guide pulleys 23 and 24. The return run of the belt is supported beneath the cradle unit by idler rollers 25. The arrangement is such that the bridged chains travel in a circuit within that in which the belt travels.

Each cross carrier not only comprises a member 21 but also incorporates a pair of metal plates 26, functioning as belt-engaging pads there being one of these pads at each end of every member 21. These pads are designed to provide a substantial area of contact with the belt 10. The pads may be slightly dished on their inner faces to give rigidity, but they present flat outer faces to the belt as Fig. 4 shows. Moreover, the pads are U-shaped, as Fig. 5 shows, the base 26A of the U having a depth about the same as the length of the limbs 26B, which in operative position on the working run of the belt 10 straddle the ends of the members 21 (see also Fig. 4). The pads are of mild steel, but they may be of thermoplastic material.

Each of the pads 26 is pivotally attached on its inner face to one end of a cross member 21. The attachment incorporates a pivot 27 located beyond the centre of gravity of the pad so that the legs 26B tend to swing downwards.

The sprockets 13 and 14, around which the endless chains pass, are so positioned and dimensioned that the pads not only engage the troughed upper run of the belt 10 but also the flat lower run, as Fig. 4 shows.

Each cross member 21, at its ends, is associated with small carriages 12A, which are equi-distant and are incorporated like enlarged links in the chains 12. Each carriage 12A has a pair of wheels 28 which ride upon lengths of rail 29 mounted to extend alongside the belt on the framework 16 of the power-driven cradle unit. These lengths of rail correspond to the effective length of the cradle unit and form supports for the chains, cross members and the upper run of the endless belt. At each end the rails have a rounded and downwardly extending portion to facilitate engagement and disengagement by the wheels 28.

In operation of the conveyor, as the chains 12 are driven, the members 21 and end pads 26 attached to the upper run of the chains support and drive the under surface of the trough-shaped upper run of the belt 10, and the pairs of wheels 28 attached to said members run on the lengths of rail 29. At the same time the end pads connected through the members 21 to the lower run of the chains 12 engage the upper surface of the lower run of the belt. As the members 21 on the upper run move round the sprockets 13 and 14 to pass to the lower run, their pairs of wheels 28 leave the rails 29; the end pads 26, which on the upper run are in V-relationship to one another with the limbs pointing downwards, turn bodily around the pulley and the limbs tend to swing downwards until the pads come into contact with the upper surface of the flat lower run of the belt so that said pads transmit driving power to both runs of the belt. On passing from the flat lower run to the troughed upper run of the belt the end pads return from horizontal to V-relationship. It will be appreciated that on the lower run the belt, itself supported on and pressed up by the idler rollers 25, gives support to the chain drive through the end pads and cross members. Thus, the work of transmitting the drive from the chains 12 to the belt 10 is spread over both runs of the chains and belt, thus reducing the major tensions in the chains and the belt.

Various modifications, within the scope of the invention, may be made to the foregoing. For instance, the bow-form cross members need not be wholly curved, but may be wholly or partly angular; that is, each member may consist of a straight middle portion, two straight end portions parallel to the middle portion, and two inclined intermediate portions. This form is well adapted to grip the belt.

The wheels 28 attached to the members 21 may be provided on axles which are mounted on and below said members (when the latter are in their upper working position).

In the drawings, Fig. 1 shows only as much of the length of the conveyor as to include one power-driven cradle unit as assembled on a complete framework 16 as a single self-contained transportable structural unit. It will be manifest that if the conveyor length is extended substantially, it will become expedient to incorporate one or more additional units. In this event, the two or more units will extend end-to-end but spaced apart in a longitudinal series. In the inter-unit spaces, the working run of the conveyor belt is supported by troughing rollers 22, as shown at the right hand end of Fig. 1, and the return run is supported by the rollers 24.

I claim:

1. In or for combination with a belt conveyor of the type stated, a driving assembly comprising a pair of juxtaposed endless power-driven cables, an endless series of bow-form cross carriers bridging said cables at spaced intervals and secured to the cables, the arrangement being such that the working run of the conveyor belt rests upon the cross carriers and adopts the form thereof, and pivotal belt-engaging pads incorporated in said carriers and devised to adopt inclined settings conformable with the belt in the working run and to adopt flat settings conformable with the belt in the return run so that said pads transmit driving power to both runs of the belt.

2. A belt conveyor driving assembly according to claim 1 in which each cross carrier is associated at its ends with carriages incorporated in said cables, each carriage having rollers, and in which rails arranged alongside the working run of the conveyor belt are engageable by said rollers so that the cross carriers are held up to the working run and the carriages transmit the weight to the rails.

3. A belt conveyor driving assembly according to claim 1 and having means for holding the return run of the endless belt against the pivotal belt-engaging pads in order to assist in the work of transmitting the drive over both runs of the belt.

4. In or for combination with a belt conveyor having an upper working run and a lower return run and of the type stated, a driving assembly comprising a pair of juxtaposed endless power-driven chains of links, equi-distant links of both chains being formed as carriages, rollers on each of said carriages, rails arranged along both sides of the upper working run of the belt, said rollers being arranged to roll upon said rails, an endless series of bow-form cross carriers bridging pairs of opposed carriages, the arrangement being such that the working run of the conveyor belt rests upon and receives driving power from the cross carriers and adopts the form thereof, and means on said cross carriers movable to engage the belt in its return run to transmit driving power thereto.

5. A belt conveyor driving assembly according to claim 4 in which the movable means on said cross carriers comprise pivotal belt-engaging pads incorporated in said carriers and devised to adopt inclined settings conformable with the belt in the working run and to adopt flat settings conformable with the belt in the return run so that said pads transmit driving power to both runs of the belt.

References Cited in the file of this patent

FOREIGN PATENTS

| | | |
|---|---|---|
| 13,996 | Norway | Oct. 21, 1904 |
| 482,743 | Germany | Sept. 24, 1929 |
| 588,450 | Great Britain | May 22, 1947 |